(12) United States Patent
Olive

(10) Patent No.: US 7,515,715 B2
(45) Date of Patent: Apr. 7, 2009

(54) INFORMATION SECURITY FOR AERONAUTICAL SURVEILLANCE SYSTEMS

(75) Inventor: Michael L. Olive, Cockeysville, MD (US)

(73) Assignee: Honeywell International Inc., Morristown, NJ (US)

( * ) Notice: Subject to any disclaimer, the term of this patent is extended or adjusted under 35 U.S.C. 154(b) by 924 days.

(21) Appl. No.: 10/886,768

(22) Filed: Jul. 8, 2004

(65) Prior Publication Data
US 2006/0008087 A1 Jan. 12, 2006

(51) Int. Cl.
*H04K 1/00* (2006.01)
(52) U.S. Cl. .................. 380/255; 380/259; 380/277; 342/30; 342/455
(58) Field of Classification Search ............. 380/255, 380/259, 277; 342/30, 455
See application file for complete search history.

(56) References Cited

U.S. PATENT DOCUMENTS 5,307,409 A * 4/1994 Driscoll .................. 380/2

6,459,411 B2 10/2002 Frazier et al.

FOREIGN PATENT DOCUMENTS

EP 1193888 A1 4/2002

* cited by examiner

*Primary Examiner*—Kimyen Vu
*Assistant Examiner*—Baotran N To
(74) *Attorney, Agent, or Firm*—Black Lowe & Graham PLLC

(57) ABSTRACT

A method and apparatus for encrypting a Mode-S extended squitter exploiting a provided key. The key includes a control key segment, an address key segment, a first message key segment, and a first parity/identity key segment. Adding modulo two the control segment to the control key segment produces an intermediate control segment. Adding modulo two the address segment to the address key segment produces an intermediate address segment. Adding modulo two the message segment to the first message key segment produces an intermediate message segment. Adding modulo two the parity/identity segment to the first parity/identity key segment produces an first intermediate parity/identity segment. Concatenating the intermediate control segment, the intermediate address segment, the intermediate message segment, and the intermediate parity/identity segment produces an intermediate extended squitter. Shifting the intermediate extended squitter according to a linear function shift register produces a shifted-intermediate parity/identity segment.

5 Claims, 9 Drawing Sheets

INFORMATION SECURITY FOR AERONAUTICAL SURVEILLANCE SYSTEMS

FIELD OF THE INVENTION

This invention relates generally to aircraft surveillance systems and, more specifically, to extended squitter communications.

BACKGROUND OF THE INVENTION

Air traffic control is a relatively new concept. Although airplanes were invented in 1903 by the Wright brothers, aviation did not become widespread until World War I. As traffic increased, a control system became necessary; at first, pilots used portable radio devices to communicate to people on the ground. After radar was invented during World War II, controllers started to use it to track both civilian and military aircraft. It was not until the late 1950's that a comprehensive air traffic control system was deployed nationwide.

Mode S is an air traffic control that relies upon data link technology that uses discretely addressed interrogations to place aircraft in a controlled airspace. Mode S equipment includes ground stations with sensors, and transponders aboard aircraft. The interrogations that ground sensors send planes include a request for identification information of the target plane. Once the identity of the aircraft is known, the ground sensor can send uniquely addressed messages known as extended squitters to which other aircraft will not respond. Replies contain information such as altitude and position reports.

The Mode S extended squitter is modeled on a form of communication that was familiar to the aviation community. In a disciplined conversation, the Mode S squitter comprises a message payload according to a very controlled regimen, a sender address, a recipient address and a parity check to assure that the message has not been garbled. The extended squitter then mimics the language of the control tower to some extent. Rather than "SeaTac approach, American three nine nine leaving two three zero, descending to two zero zero," the Mode S extended squitter has the sender's identity, the recipient's identity, and a message. Just as the discipline of the pilots and controllers on a frequency causes them to ignore transmissions that do not name them, where the recipient address is neither all zeros (all call), nor the address of the intended recipient, the Mode S transponder simply ignores the transmission.

A TCAS equipped aircraft, independent of any ground inputs, performs surveillance of nearby aircraft by issuing interrogations at 1030 MHz. The transponders reply to TCAS on the 1090 MHz bandwidth. The replies are received and decoded by the surveillance portion of the TCAS software and the information is then provided to the collision avoidance algorithms.

Detection and tracking of another Mode-S equipped aircraft is dependent upon the ability of the TCAS receiver to hear the Mode-S extended squitter (automatic broadcast from the other aircraft's transponder) and the ability of the TCAS to reach the other aircraft with an interrogation. The designed parameters of the signal is especially useful as the power and the transmission radius of the messaging are small enough to assure that only relevant aircraft are involved in the conversation. The capability to receive another of transponder's extended squitter and interrogation replies is determined by the Minimum Triggering Level (MTL) of the TCAS RF receiver. The more sensitive the receiver, the lower the MTL.

Referring to FIG. 1, an exemplar 1 of a Mode-S extended squitter includes a control segment 2, 8 bits in length indicating the nature of the traffic; an address segment 3, 24 bits in length and configured, as indicated above, to uniquely designate the recipient and the recipient of the extended squitter or to place an "all call" to aircraft in the vicinity; a message payload segment 4 of exactly 56 bits in length; and a parity segment, indicative of the content of the message of 24 bits in length. By maintaining the discipline of message purpose, length, and format, a crowded airspace will still allow a great deal of interaction to assure safe passage through the airspace.

In military applications, relying on Mode-S extended squitter traffic for positioning and direction is useful but also exposes an Achilles heel to an enemy. For instance, where a an element 10, includes an element leader 15 and two formation members 12 and 18, extended squitter traffic through TCAS avionics 7, allow the element leader 15 to set the direction for the element 10, having formation members 12 and 18, "form up" on the element leader 15. When the element 10, joins a larger formation 5, the element leader 15 may "bind on" to the formation leader 24; "forming up" among additional element members 21 and 27.

In communication, as well, with commercial aircraft 9, the formation 5, by its formation leader 24 can safely avoid interference with commercial aircraft 9. Where aircraft are below a radar horizon, for instance flying within close proximity to terrain, the ability to avoid commercial aircraft 9 can be especially useful.

An enemy 6 might use the Mode-S extended squitter to hunt or sabotage the formation. As indicated, the anti-collision capability Mode-S use allows relies upon an interrogation and reply constituting a steady stream of extended squitter traffic. If either an enemy fakes or "spoofs" an interrogation or reply, a military aircraft might be steered or directed into a second aircraft or into terrain. Additionally, if the extended squitter traffic is subject to enemy 6 eavesdropping, there is no possibility of attacking without advance notice. Thus, it is very advantageous to have a method of communicating through a extended squitter without exposing its operation to the enemy.

There is, therefore, an unmet need in the art for a secure extended squitter system that is not subject to spoofing nor will betray the location of a military aircraft.

SUMMARY OF THE INVENTION

The present invention comprises a system for aircraft surveillance that employs strong cryptographic encryption techniques to ensure that military formation aircraft enjoy the benefits of an aircraft surveillance system while they reject intentionally incorrect or deceptive extended squitter messages sent by an adversary in an attempt to spoof the message recipient.

In addition, in one presently preferred embodiment of present invention prevents eavesdropping on extended squitter traffic between military formation aircraft since encryption protects the message field content of legitimate aircraft extended squitters from unauthorized disclosure to adversaries who may monitor RF transmissions in an attempt to track formation aircraft.

To counter potential active spoofing attacks, the inventive system and method employs an encryption algorithm to encrypt the message field of standard Mode-S extended squitter transmissions while allowing the remaining fields to remain thereby allowing the transmission to be recognized as a Mode-S extended squitter transmission. The algorithm advantageously encrypts and decrypts by means of addition modulo two. Performing addition modulo two is the same as the action of a bit-wise XOR gate. Encryption and decryption occur by adding two binary words of congruent length modulo two. The advantage to this method is that if a word is added to a key in modulo two and the key is again added to the resulting word, the final result will be the original word, thus encryption and decryption may occur by virtue of the same operation.

Any algorithm that is based on randomness may generate keys. One presently preferred method is the NIST-approved Advanced Encryption Standard (AES) crypto-algorithm with 128-bit keys and non-expansive Cipher Feedback (CFB) mode. In accordance with further aspects of the invention, the transponder uses the National Institute of Standards and Technology (NIST) approved AES algorithm with 128-bit key. Another presently preferred embodiment relies on a truly random seed and a changing password to act as an initiation vector to derive a key. In any embodiment, the key is used to encrypt the 112-bit Mode-S extended squitter.

In accordance with other aspects of the invention, one presently preferred embodiment uses key management exploiting a PCMCIA-based key delivery system thereby taking advantage of standard Commercial Off-the-Shelf (COTS) workstations outfitted with a PCMCIA card slot to program the PCMCIA cards with an encrypted key database.

In accordance with still further aspects of the invention, another preferred embodiment supports key delivery via the existing DoD Electronic Key Management System (EKMS). The EKMS is a multi-tiered system consisting of the NSA-operated Central Facility (CF or Tier 0), and the multi-service Common Tier 1 system, which interfaces with the CF and serves as the office-of-record and COMSEC material repository for Army, Navy, Air Force, and other COMSEC accounts. At Tier 2, the Air Force Electronic Key Management System (AFEKMS), which consists of a Key Processor (KP) and a Local Management Device (LMD) workstation, manages distribution of the keys necessary for operation of airborne platforms. The Tier 3 AN/CYZ-10 Data Transfer Device (DTD) is used to load keys electronically into the cryptographic devices installed on the airborne platform. With an EKMS-based approach, the keys necessary for operation of the MILACAS-FR would be loaded via the DTD at the same time that other existing cryptographic devices (e.g., airborne SINCGARS or KY-100 ANDVT) are loaded.

In accordance with yet other aspects of the invention, the inventive processor adheres the 56-bit Message Field convention prior to transmission such that there is no expansion of the message field size over those transmitted or received by a commercial extended squitter. Further, S-Control, Mode S Address and Parity fields are transmitted in an unencrypted form allowing rapid discernment of the nature of the transmission even without decryption. In accordance with still another aspect of the invention, all encryption-equipped inventive receivers within range of an encryption-equipped inventive transmitter are able to decrypt all extended squitters (i.e., non-selective broadcast). An embodiment for a secure version of Mode S surveillance transponder is suitably interactive with commercial Mode S transponders so that the military will have sufficient information as to the location of commercial aircraft and will suitably avoid collision with the commercial aircraft. The military aircraft can suitably interrogate the commercial aircraft without subjecting the military aircraft to receiving counterfeit or "spoofed" extended squitter traffic meant to mislead the military aircraft.

As will be readily appreciated from the foregoing summary, the invention provides a method and apparatus for encrypting a Mode-S extended squitter exploiting a provided key. The key includes a control key segment, an address key segment, a first message key segment, and a first parity/identity key segment. Adding modulo two the control segment to the control key segment produces an intermediate control segment. Adding modulo two the address segment to the address key segment produces an intermediate address segment. Adding modulo two the message segment to the first message key segment produces an intermediate message segment. Adding modulo two the parity/identity segment to the first parity/identity key segment produces an first intermediate parity/identity segment. Concatenating the intermediate control segment, the intermediate address segment, the intermediate message segment, and the intermediate parity/identity segment produces an intermediate extended squitter. Shifting the intermediate extended squitter according to a linear function shift register produces a shifted-intermediate parity/identity segment.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a method and apparatus for encrypting a Mode-S extended squitter exploiting a provided key. The key includes a control key segment, an address key segment, a first message key segment, and a first parity/identity key segment. Adding modulo two the control segment to the control key segment produces an intermediate control segment. Adding modulo two the address segment to the address key segment produces an intermediate address segment. Adding modulo two the message segment to the first message key segment produces an intermediate message segment. Adding modulo two the parity/identity segment to the first parity/identity key segment produces an first intermediate parity/identity segment. Concatenating the intermediate control segment, the intermediate address segment, the intermediate message segment, and the intermediate parity/identity segment produces an intermediate extended squitter. Shifting the intermediate extended squitter according to a linear function shift register produces a shifted-intermediate parity/identity segment.

Mode S is a datalink technology that uses discretely addressed interrogations. Mode S equipment includes ground stations with sensors, and transponders aboard aircraft. The interrogations that ground sensors send planes include the identification information of the target plane. In a commercial transponder, Mode S has a data link capability with each aircraft being assigned a unique address code. The unique address code is hardwired into the airframe transponder and is broadcast in unsolicited "extended squitter" transmissions occurring approximately every second. ATC or another Mode S equipped aircraft will use this address for interrogation or communication purposes. If the Mode S recipient address is missing or invalid, the aircraft will be "invisible" to any Mode S system. The military Mode S extended squitter would have an encrypted recipient address thereby rendering the extended squitter invisible to the transponders for commercial aviation.

Throughout the detailed description the specification will use a verb for the action of an exclusive OR gate know as an XOR gate in the bit-by-bit action on two words of similar length. As used in this specification, the word to "add" or to "add modulo two" means the bit-by-bit activity of the XOR gate to generate a word similar in length to the compared words. XOR gates are used because unlike an OR gate, the XOR generates a truth table with no results that are independent of either of the input bits. In an OR gate, should either of the input bits be a logical "YES," the result, in turn, is a logical "YES" regardless of the remaining compared bit. Thus, in using the OR gate, information as to the identity of the remaining compared bit is lost. In using an exclusive or-gate or an XOR gate, the result of comparing a logical "YES" will always depends upon the remaining comparison bit.

Figure 2:
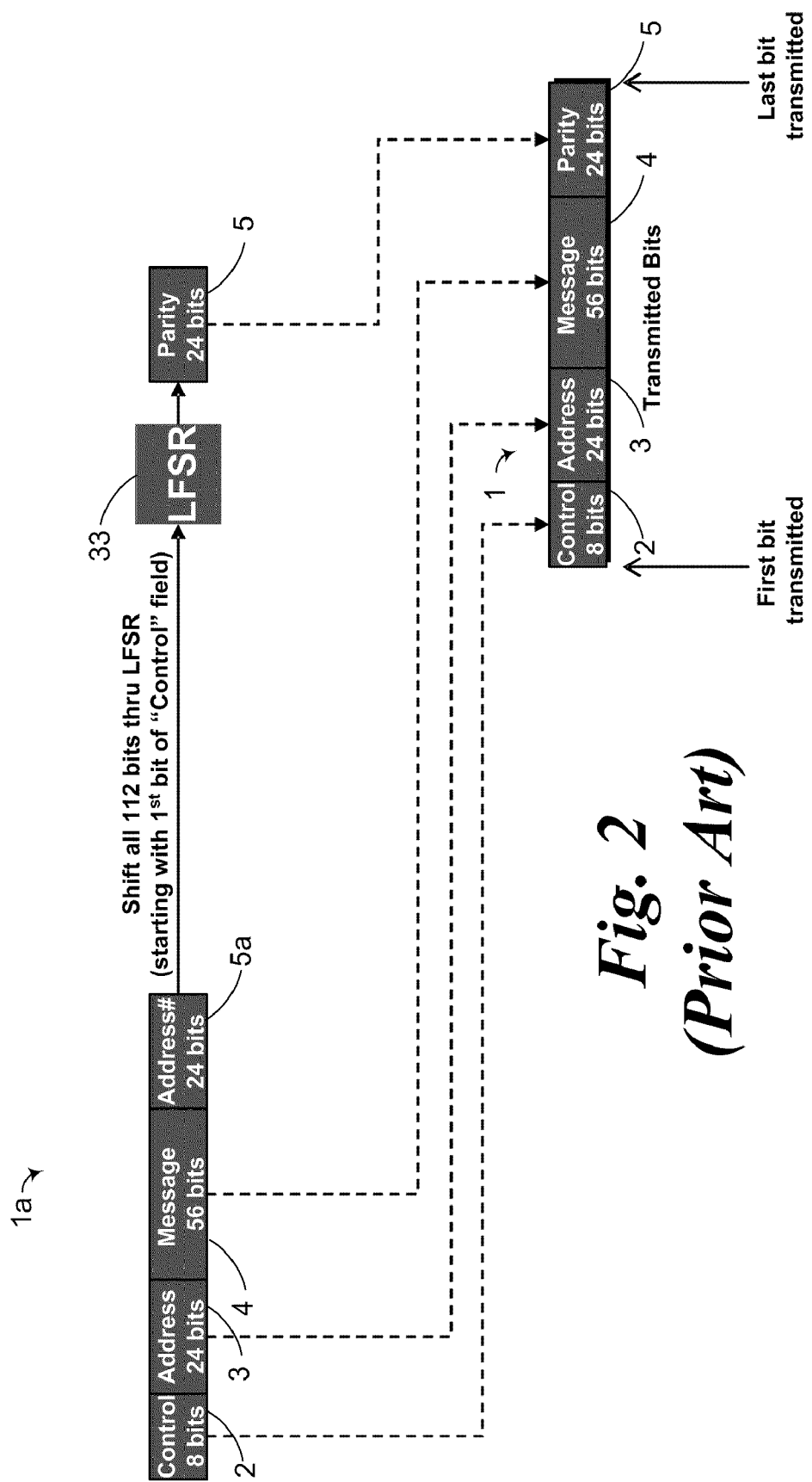
FIG. 2 is a block diagram of a prior art Mode-S extended squitter transmission composition section.

Referring to FIG. 2, an exemplar 1 of a Mode-S extended squitter includes a control segment 2, 8 bits in length and indicating the nature of the traffic; a sender address segment 3, 24 bits in length and configured, as indicated above, to uniquely designate the sender of the extended squitter or to place an "all call" to aircraft in the vicinity; a message payload segment 4 of exactly 56 bits in length; and a parity/identity segment 5a, indicative both of the recipient and of the content of the message and 24 bits in length.

In order to allow error correction in Mode S messages, the signal format was designed to include a robust parity check. Having parity coding in Mode S messages represents a significant advantage; in the case that an error occurs, the sensor avoids the penalty of retransmission. In addition, the designers of Mode S needed to provide some form of redundancy in the message coding, to protect against possible interference.

The code selected for the Mode S uplink is a cyclic code generating 24 parity check bits, which can correct many error patterns, up to 24 bits. The particular cyclic code that is used is described by the following polynomial:

$$g(x)=x^{24}+x^{23}+x^{22}+x^{21}+x^{18}+x^{17}+x^{16}+x^{15}+x^{14}+x^{13}+x^{12}+x^{11}+x^{10}+x^{3}+1$$

Kasami first discovered this code in 1964; it has been proven to be able to correct any single 24-bit error burst. The generating polynomial known as a Kasami sequence and is selected for its good cross correlation functions. With a 24-bit parity code, the probability of not detecting a corrupted payload is approximately $2^{-24}$, or $5.96 \times 10^{-8}$.

At a first state, parity bits in the parity/identity segment 5a are initialized with a recipient address. The recipient address is also known as the interrogator address and is uniquely assigned to the Mode-S used by the recipient of the extended squitter. Because a recipient transponder is always aware of the interrogator address assigned to it, the address may be safely overlaid or added in modulo two to the parity/identity segment without obscuring the parity word or check sequence.

The parity check sequence of an encoded message is combined with the transponder address by modulo two summation. A linear feedback shift register or LFSR 33 accomplishes the summation modulo two. The transponder can remove the parity check bits by modulo two summation. If the parity check sequence of bits calculated in the transponder equal the parity check bits combined in the address, the result of this summation produces the transponder address and therefore verifies the validity of the extended squitter 1.

The LFSR 33 is a shift register that, when clocked, advances the signal through the register from one bit to the next most-significant bit. A linear feedback shift register can be formed by performing exclusive-OR on the outputs of two or more of the flip-flops together and feeding those outputs back into the input of one of the flip-flops. The outputs that influence the input are called taps. The tap sequence of an LFSR 33 can be represented as a polynomial modulo two, the Kasami sequence discussed above. The completion of the process generates the parity segment 5 for transmission. The extended squitter 1 is assembled for transmission including the parity segment 5.

Figure 3:
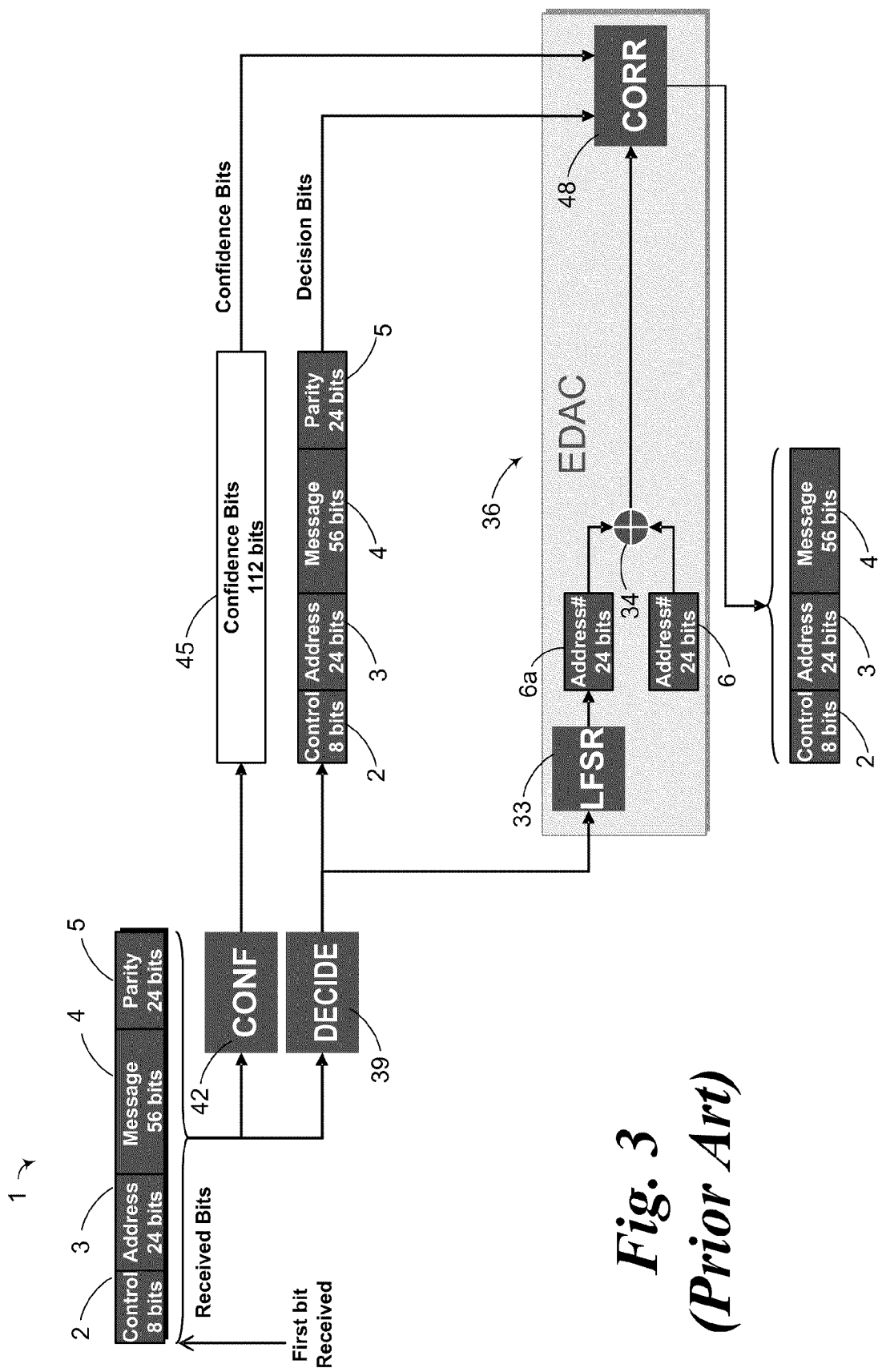
FIG. 3 is a block diagram of a prior art Mode-S extended squitter reception reconstitution section.

Referring to FIG. 3, the assembled and transmitted extended squitter 1 is received and simultaneously sent to a confidence logic circuit 42 and a decide logic circuit 39. At the confidence logic circuit 42, the extended squitter 1 is compared bit by bit to templates for logical highs and lows and identifies malformed bits to for a 112-bit confidence word 45 indicative of confidence based upon waveform. In the decision logic circuit 39, the extended squitter 1 is compared segments 2, 3, 4, and 5 are compared with appropriate contents for each of the control segment 2, the address segment 3, the message segment 4 and the parity/identity segment 5. At a correction circuit 48, within the error detection and correction block 36, the LFSR 33 operates on the parity/identity segment 5 as received to yield a parity/identity segment 6a. An XOR 34 adds modulo two the actual address 6 to the received parity/identity segment 6a from the received extended squitter 1. Where no errors occur, the result is a 24 bit zero. The nature of such errors as occur, along with the confidence bits 45, along with the results of the comparison to the template words, drives the correction circuit 48 to generate the corrected control segment 2, the corrected address segment 3, and the corrected message segment 4.

Figure 4:
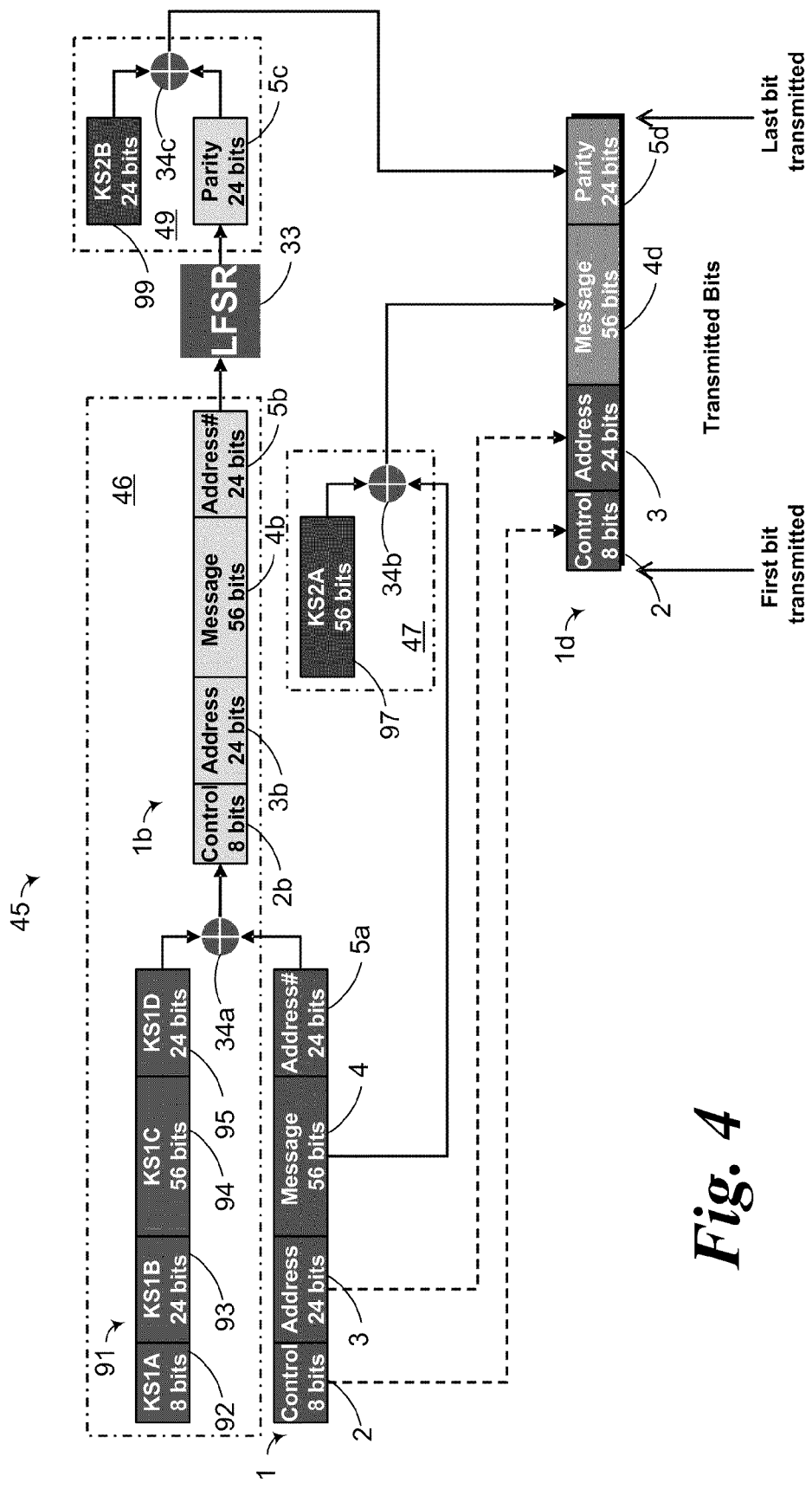
FIG. 4 is a block diagram of an encryption Mode-S extended squitter transmission composition section.

Referring to FIG. 4, a transmitter embodiment 45 is based upon the prior art transmitter discussed in relation to FIG. 2, but further includes a first encryption section 46, a message encryption section 47, and a parity encryption section 49. The transmitter embodiment 45 encrypts an extended squitter 1. Within the first encryption section 46, at an XOR 34a, a bit-by-bit comparison of the composed extended squitter 1 and a first code segment 91 consisting of an eight-bit control segment 92; a twenty-four bit sender address segment 93, a fifty-six bit message segment 94, and a twenty-four bit recipient address segment 93 are compared to generate a singly-encrypted extended squitter 1b. Just as in the prior art unencrypted transmitter discussed in relation to FIG. 2 above, the LFSR 33 operates to generate a parity/identity segment 5c, this parity/identity segment being the result of the a parity operation on the encrypted rather than an unencrypted extended squitter 1b.

A second encryption, in the message encryption section 47, is used to further obscure both the parity and the message portion of the unencrypted extended squitter 1. A second code segment consisting of a message key segment 97 and a parity/identity key segment 99 further obscure the message contents by two actions. As for the message segment 4 of the composed extended squitter 1, a second XOR gate 34b operates to encrypt the message by comparing it to the message key segment 97 to generate the encrypted message segment 4d in a transmittable segment id.

Figure 1:
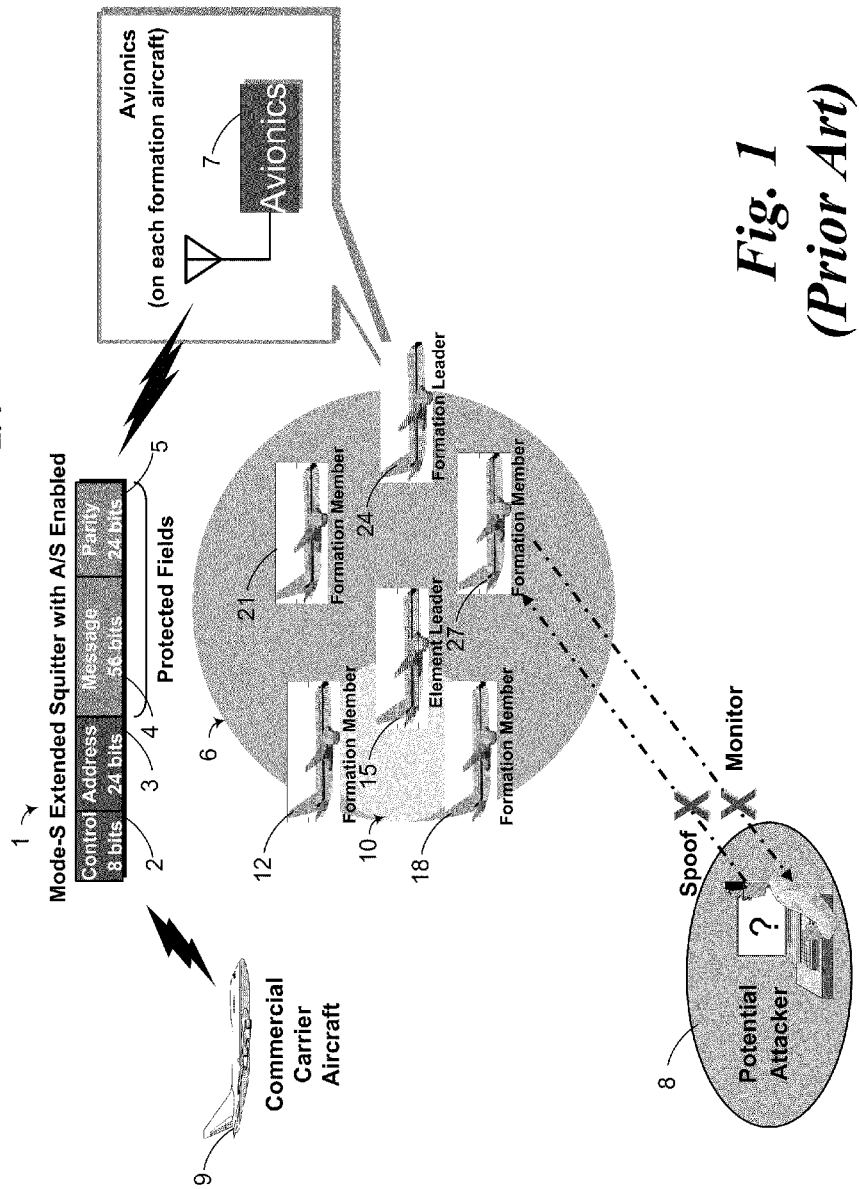
FIG. 1 is a block diagram of a prior art Mode-S extended squitter network.

In the parity encryption section 49, a third XOR gate 34c operates to add modulo two the parity segment 99 with the once encrypted parity segment 5c, to generate a twice-encrypted parity segment 5d for inclusion in the transmitted extended squitter 1d. The transmitted extended squitter is, then, composed of the original control segment 2, the original address segment 3 and the once encrypted message segment 4d and the twice-encrypted parity segment 5d. The transmitted extended squitter 1d is then transmitted by conventional avionics 7 (FIG. 1). By including this twice encrypted parity/identity segment 5d in the encrypted squitter, only with the appropriate key will the Mode S transponder be able to discern a meaningful address and parity key in the twice encrypted parity/identity segment 5d.

As with the discussion of the receiver embodiment set forth below, it is notable that the hardware necessary to implement the embodiment of the extended squitter compiler set forth above is both configurable and consists of commercial off the shelf hardware. By configurable, it is meant that with minimal switching, avionics designed with the inventive encryption will readily function as compatible with commercial equipment such as that described in FIGS. 2 and 3. Additionally, the invention consists only of such hardware as would normally be present in such commercial equipment. These two characteristics will also describe the receiver embodiment set forth below in the descriptions relating to FIGS. 5 through 9. The security that the invention facilitates comes from the security of the first and second code segments and not from arcane variations of the hardware.

Figure 5:
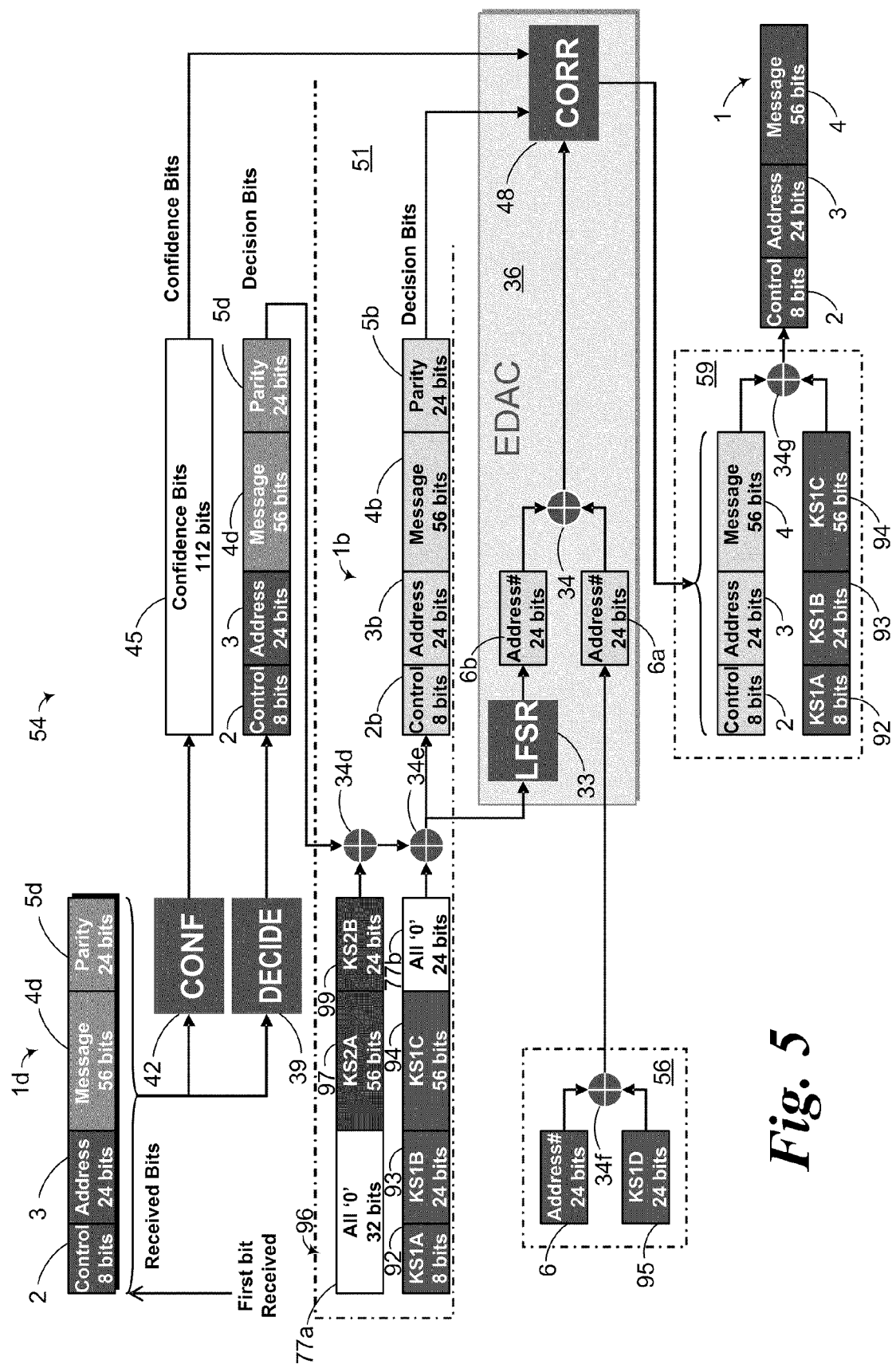
FIG. 5 is a block diagram of a decryption Mode-S extended squitter reception reconstitution section.

Referring to FIG. 5, an inventive receiver embodiment 54 is based upon the prior art receiver discussed in regard to FIG. 3 but includes a first decryption section 51, a parity decryption section 56, and a message decryption segment 59 and decrypts the encrypted extended squitter 1d consisting of the control segment 2, the address segment 3, the once encrypted message segment 4d and the twice-encrypted parity segment 5d. As discussed in regard to FIG. 3, the encrypted extended squitter 1d is received and simultaneously sent to a confidence logic circuit 42 and a decide logic circuit 39. At the confidence logic circuit 42, the extended squitter 1d is compared bit by bit to templates for logical highs and lows and identifies malformed bits to for an 112-bit confidence word 45 indicative of confidence based upon waveform.

The first departure from the prior art receiver discussed in relation to FIG. 3 above is the first decryption section 51. As indicated above in regard to the transmission embodiment set forth at FIG. 4, there are two code segments, a first code segment 91 consisting of an eight-bit control segment 92; a twenty-four bit address segment 93, a fifty-six bit message segment 95; and a second code segment consisting of a message segment 97 and a parity segment 99. A whole code key can be formed of a concatenation of the first code segment 91 with the second code segment.

As the second code segment was the last applied in generating the encrypted extended squitter 1d for transmission, it is the first applied in the decryption or unpacking of the encrypted extended squitter 1d. An XOR gate 34d combines a "padded" second code segment 96 with the encrypted extended squitter 1d. The "padded" second code segment consists of a first padding block 77a concatenated with the message segment 97 and then the parity segment 99. The first padding block 77a is a 32 bit zero used to prevent the XOR gate 34d from modifying the control segment 2 and the message segment 3 of the received extended squitter 1d. The second code message segment 97 and the second code parity segment 99, by the operation of the XOR gate 34d operate to decrypt the message segment 4d and the parity/identity segment 5d to the singly encrypted extended squitter 1b. This single action undoes the encryption that occurred in the message encryption section 47 and the parity encryption section 49 (FIG. 4).

A second XOR gate 34e decrypts the control segment 2 and the address segment 3, left unencrypted by the action of the prior XOR gate 34d as well as the once decrypted message segment 4 (FIG. 4). A second padding block 77b is a 24 bit zero. This padding block leaves the parity/identity segment 5b unchanged.

To preserve the ability of the receiver to reconstruct messages that become slightly garbled in transmission, the LFSR 33 in the EDAC 36 requires the singly-encrypted extended squitter 1b that in the transmitter 45 (FIG. 4) that was used to generate the parity/identity block 5b. Recalling that the parity encryption section 49 in the transmitter 45 (FIG. 4) acted on a singly-encrypted address segment to create the parity/identity segment 5b, that same action is repeated in the receiver parity section 56, wherein an XOR 34f adds modulo two the received address to the first code parity segment 95. The sum, in the absence of garbling should equal the shifted block 3a and where it does not, the same operation of the EDAC 36 to reconstruct the signal is the same as in the prior art receiver described in relation to FIG. 3 above.

Once a corrected signal is generated, it is decrypted using first code segments, specifically the control key segment 92, the address key segment 93, and message key segment 94. After the addition modulo two by an XOR gate 34g, the original extended squitter 1 emerges. Those skilled in the art will readily appreciate that the actions of the receiver leverage the already existing technology for extended squitter handling as described in relation to FIGS. 2 and 3 by preserving, generally, the flow of information through the prior art transmitter and receiver. Where there have been additions to the information flow through the system, for instance the addition of the first encryption, the message encryption, and the parity encryption sections, these have been added without compromising the function of the underlying transmitter.

Also appreciated by one skilled in the art is necessity of performing all of the necessary decryption in order to properly decrypt the twice-encrypted parity/identity segment 5d, and doing so requires the encryption of the extended squitter 1. Because of the multiple encryption, spoofing a message without the several code key segments: the eight-bit control key segment 92; the twenty-four bit address key segment 93, the fifty-six bit message key segment 95; and the second code segment consisting of a message key segment 97 and the parity/identity key segment 99, becomes substantially impossible; 1 in $6.28 \times 10^{57}$.

Key management, however, is very easy as the entirety of the code is 192 bits long, just larger than the extended squitter 1 itself. Secure distribution or generation of appropriate keys is readily accomplished by known means.

Figure 6:
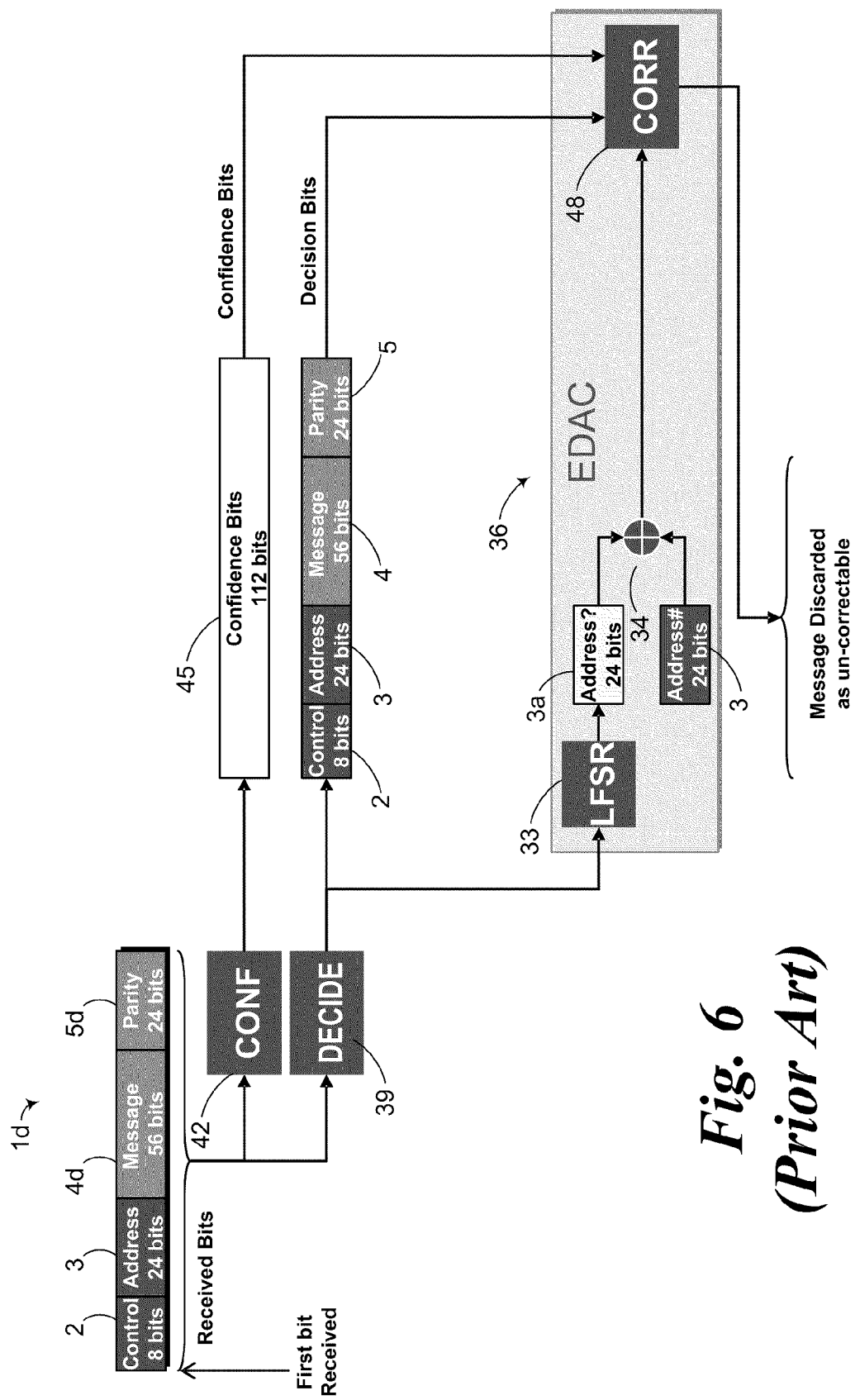
FIG. 6 is a block diagram of a prior art Mode-S extended squitter reception reconstitution section acting upon an encrypted Mode-S squitter.

Referring to FIG. 6, when the suitably encrypted extended squitter 1d is received by either a prior art receiver as described in relation to FIG. 3. Assuming a best case scenario to examine the operation of the receive, the receiver receives the extended squitter has not been garbled in transmission and therefore the confidence circuitry 42 passes confidence bits indicative of reception integrity or complete confidence. In the decision logic circuit 39, the segments are compared with appropriate contents for each of the control segment 2, the address segment 3, the message segment 4d and the parity/identity segment 5d. At a correction circuit 48, within the error detection and correction block 36, the LFSR 33 operates on the parity/identity segment 5 as received to yield an expected recipient address segment 3a. An XOR 34 adds modulo two the recipient address segment 3a to the recipient address segment 3 from the received extended squitter 1.

For an unencrypted extended squitter 1 (FIG. 3), where no transmission errors occur, the expected recipient address 3a will equal the recipient address 3 for result that is a 112 bit zero. In the instance of the encrypted extended squitter 1d, the expected address 3a will not equal the address 3 for result and the result is a non-zero nor do the errors of the non-zero result coincide with bits identified in the confidence bits 45 as garbled therefore, the extended squitter 1d is discarded as unintelligible or uncorrectable in the EDAC 36. As a result, the message is discarded according to the designed functionality of the receiver. The formation 6 remains undetected on the commercial aircraft 9 (FIG. 1) as the encrypted message cannot be distinguished from out of range or garbled transmissions.

Figure 7:
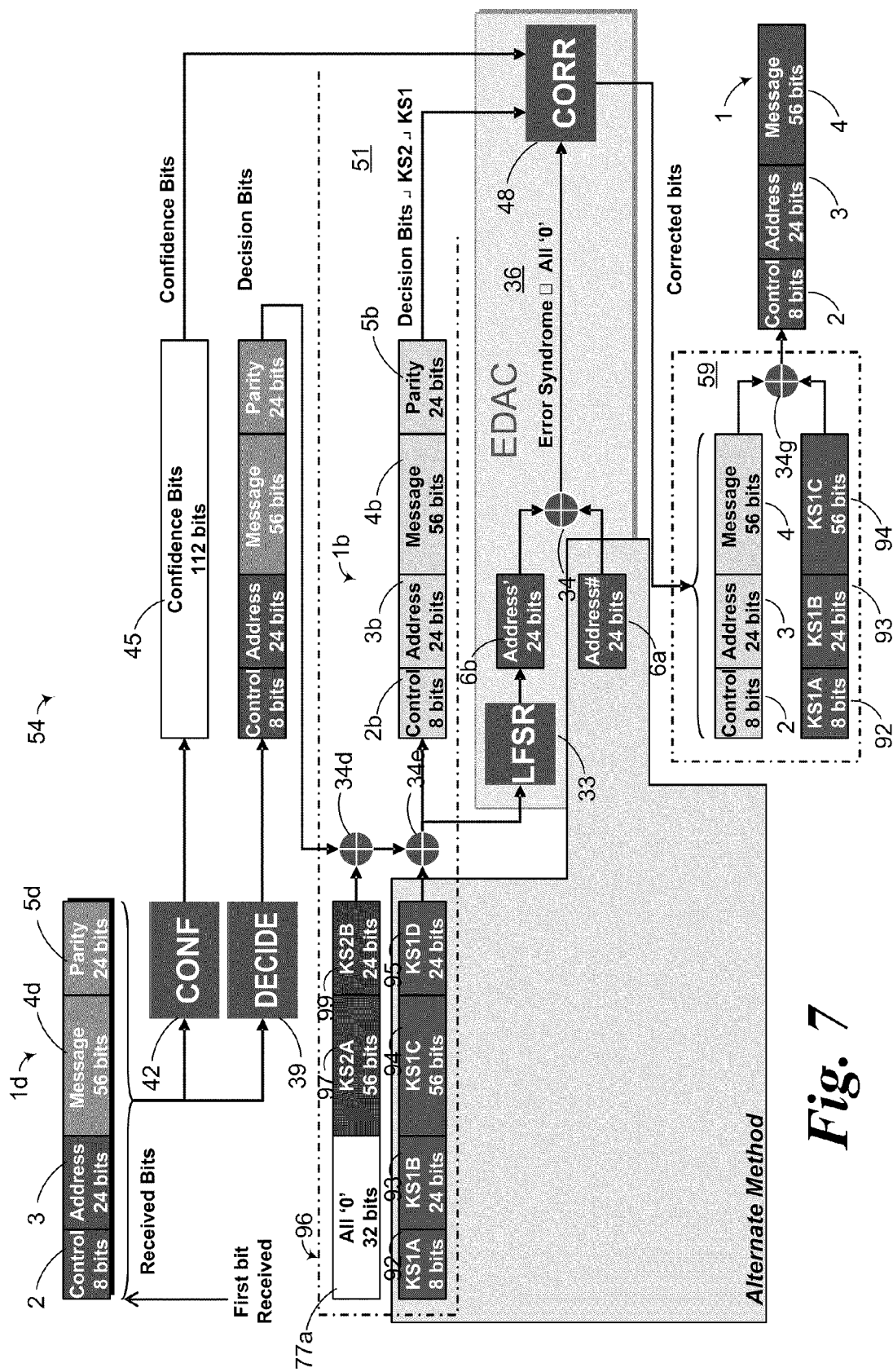
FIG. 7 is a block diagram of an alternative decryption Mode-S extended squitter reception reconstitution section.

Referring to FIG. 7, an alternative to the decoding method described above in relation to FIG. 5. In contrast to the padding of the first key segment with a second padding block 77b in the place of the parity/identity segment 95 for distinct processing, the whole of the first code segment 91 consisting of an eight-bit control segment 92; a twenty-four bit address segment 93, a fifty-six bit message segment 95, for a single addition modulo two to produce the singly decrypted squitter 1b. This approach exploits the cyclic nature of modulo two addition whereby the EDAC 36 can operate on either the encrypted or unencrypted parity/identity block 5b. By this method, there is no need for the action of the XOR gate 34f (FIG. 5). Nonetheless, the same decryption reliably occurs.

Figure 8:
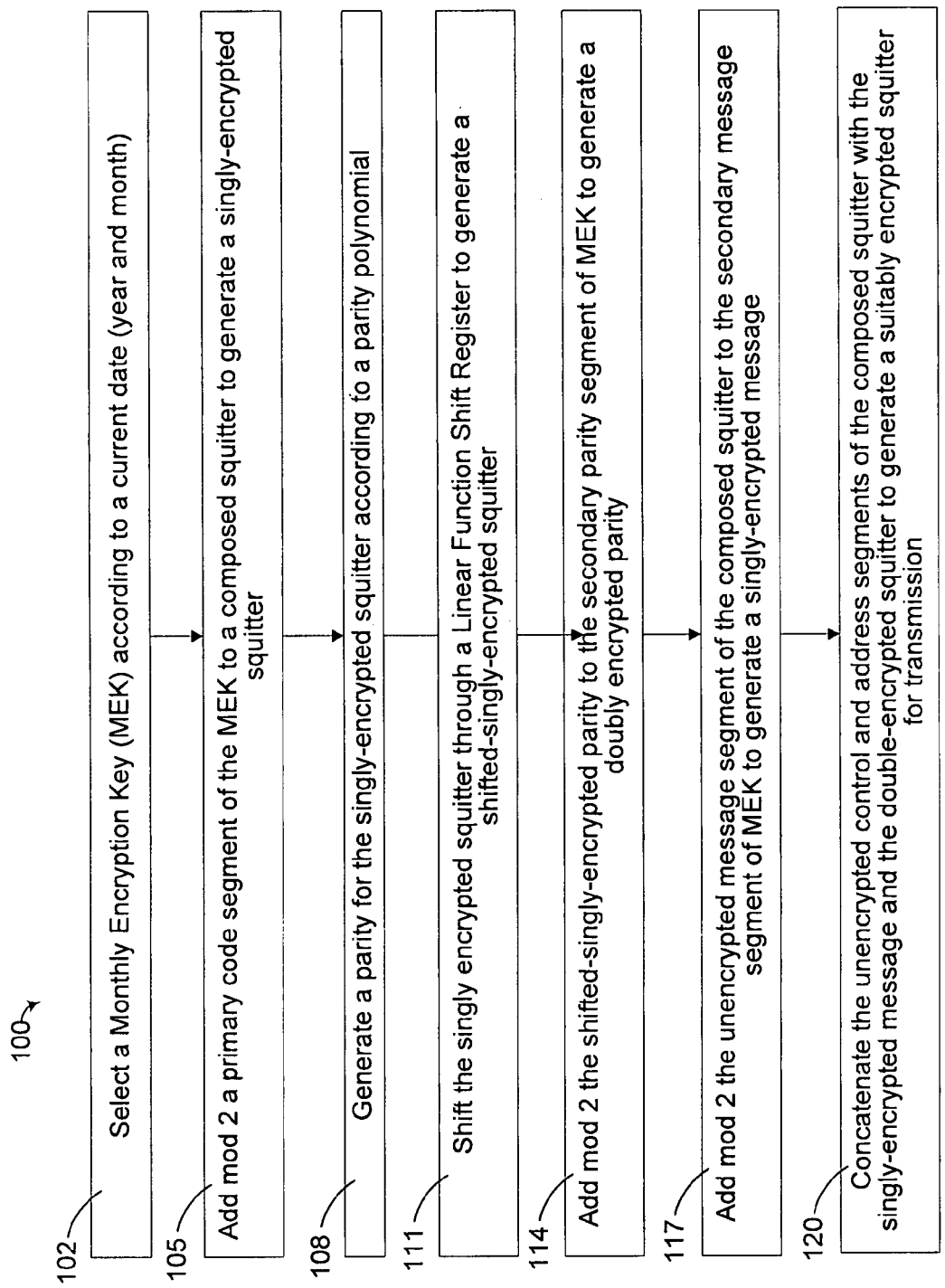
FIG. 8 is a flowchart for the method of encrypting a extended squitter.

Referring to FIG. 8, a presently preferred transmission protocol 100 begins at a block 102, wherein the current date, is used to select an appropriate monthly encryption key. The monthly encryption key consists of 192 bits, the 192 bits ordered to include: a control key segment of 8 bits; an address key segment of 24 bits; a first message key segment of 56 bits, a first parity/identity key segment of 24 bits, a second message key segment of 56 bits and a second parity/identity key segment of 24 bits.

In cryptography, a key is a relatively small amount of information that is used by an algorithm to customize the transformation of plaintext into ciphertext (during encryption) or vice versa (during decryption). Broadly-defined, an algorithm is an interpretable, finite set of instructions for dealing with contingencies and accomplishing some task which can be anything that has a recognizable end-state, end-point, or result for all inputs. Algorithms often have steps that repeat (iterate) or require decisions (logic and comparison) until the task is completed.

In one presently preferred embodiment, each key is generated for use by an agency, generally the NSA, but any agency could generate a suitable key. The monthly encryption key of the presently preferred embodiment is a symmetric key used during a defined month, though the invention need not be limited to monthly keys and in some specific instances, keys with distinct durations of validity might be used without varying the spirit or nature of the invention. The only requirement, because of the use of a symmetric key algorithm is that all of the involved aircraft do have the same key. An advantage of monthly encryption cards is that military aircraft on distinct missions may operate in the presence of each other and all can be aware of the movements of the others without sharing that information with non-military aircraft and groundstations. Thus, military aircraft can "bind on" to a mission where necessary.

The presently preferred embodiment supports key delivery via the existing DoD Electronic Key Management System (EKMS). The EKMS is a multi-tiered system consisting of the NSA-operated Central Facility (CF or Tier 0), and the multi-service Common Tier 1 system, which interfaces with the CF and serves as the office-of-record and COMSEC material repository for Army, Navy, Air Force, and other COMSEC accounts. At Tier 2, the Air Force Electronic Key Management System (AFEKMS), which consists of a Key Processor (KP) and a Local Management Device (LMD) workstation, manages distribution of the keys necessary for operation of airborne platforms. The Tier 3 AN/CYZ-10 Data Transfer Device (DTD) is used to load keys electronically into the cryptographic devices installed on the airborne platform.

With an EKMS-based approach, the keys necessary for operation of the MILACAS-FR would be loaded via the DTD at the same time that other existing cryptographic devices (e.g., airborne SINCGARS or KY-100 ANDVT) are loaded. A symmetric-key algorithm is an algorithm that uses the same cryptographic key to encrypt and decrypt the message. (Actually, it is sufficient for it to be easy to compute the decryption key from the encryption key and vice versa.). If the decryption key is lost, encrypted data will not, in practice, be recoverable, and at least for high quality encryption algorithms and large enough key sizes.

Symmetric-key algorithms can be divided into stream ciphers and block ciphers. Stream ciphers encrypt the bits of the message one at a time, and block ciphers take a number of bits and encrypt them as a single unit. A block cipher is a type of symmetric key cipher which operates on groups of bits of a fixed length, termed blocks, in contrast to stream ciphers, which encrypt each bit of the plaintext one at a time before moving on to the next. Block sizes are typically 64 or 128 bits, though some ciphers have a variable block size. The Advanced Encryption Standard, or AES, is a block cipher based upon a 128-bit size and adopted as an encryption standard by the US government, and is used worldwide and analyzed extensively, as was the case with its predecessor, the Data Encryption Standard (DES). It was adopted by National Institute of Standards and Technology (NIST) as US FIPS PUB 197 in November 2001 after a 5-year standardization process.

At a block 105, a first code segment is compared to a composed extended squitter using an XOR gate to produce a singly-encrypted extended squitter. A composes extended squitter is a message defined according to the Mode-S convention and is a 112-bit word, consisting of an eight-bit control segment followed by a twenty-four bit address segment, then a fifty-six-bit message segment, and, finally, a twenty-four bit parity segment. Recalling that comparison with an encryption key by means of an XOR gate produces a unique result, and the result, when compared again with the same encryption key will reliably produce the unencrypted plaintext, no information is lost in encryption by means of XOR gate comparison.

At a block 108, a parity is generated for the whole of the encrypted extended squitter to allow the reconstruction of the message in due to transmission in a noisy environment. Maintaining the convention for handling extended squitter composition, the parity results from comparing the whole of the message with a known polynomial, a Kasami polynomial, generates a comparison word that is in turn compared with the 24-bit address to generate the parity for the extended squitter. The parity is concatenated with the original control, address, and message segments of the composed extended squitter to generate a singly-encrypted extended squitter.

At a block 111, the singly-encrypted extended squitter is fed into the linear shift register to generate a shifted-singly-encrypted extended squitter.

At a block 114, the parity/identy segment of the shifted-singly-encrypted extended squitter is compared to the parity/identity key segment of the second code segment to produce a doubly-encrypted extended squitter segment.

At a block 117, the message segment of the composed extended squitter is compared to the message segment of the second code segment to produce a singly-encrypted message.

At a block 120, the control segment and the address segment of the composed extended squitter are concatenated with the singly-encrypted message and then with the doubly-encrypted parity to produce an encrypted extended squitter for transmission. Transmission is then handled by conventional means.

Figure 9:
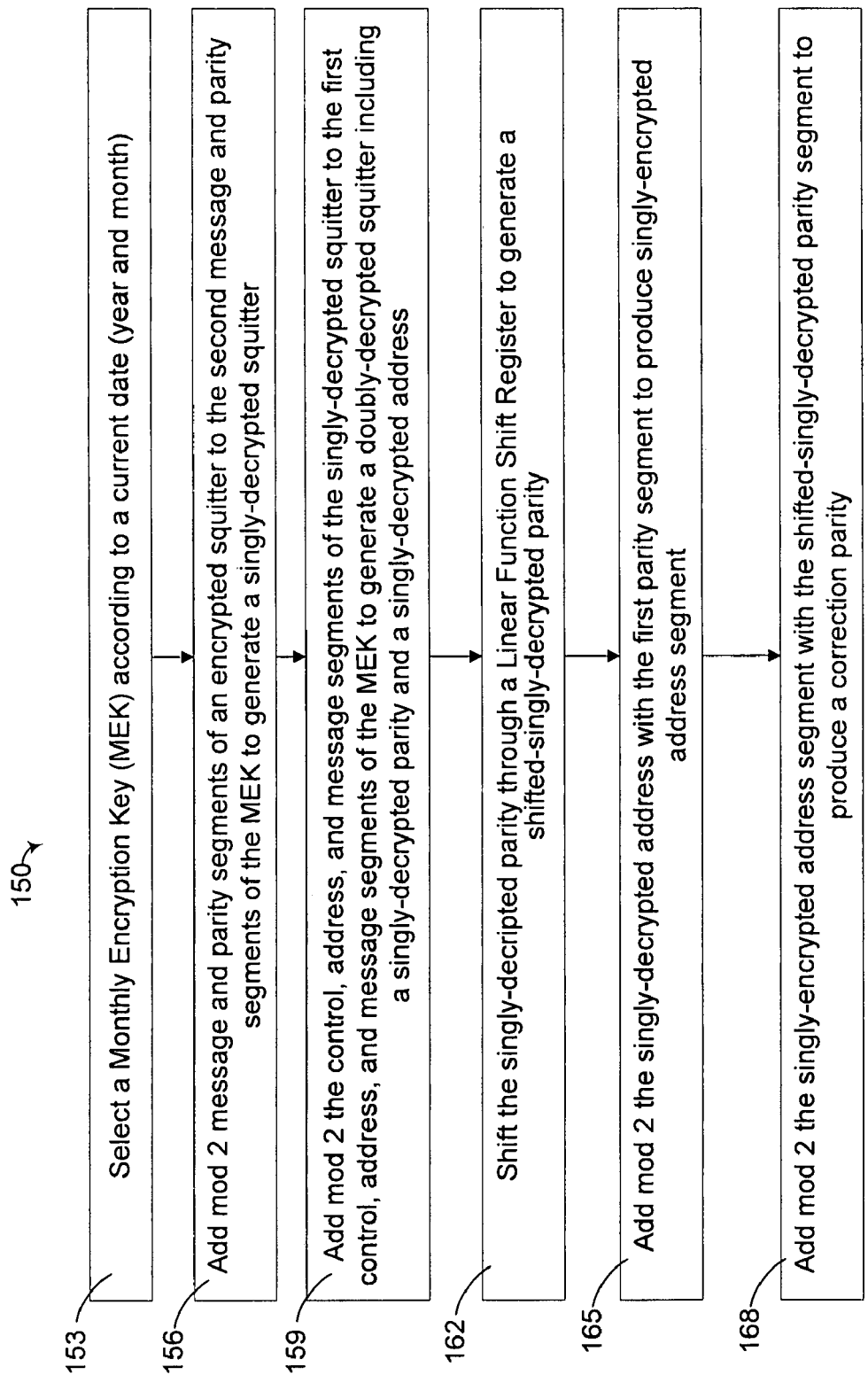
FIG. 9 is a flowchart for decrypting an encrypted extended squitter.

Referring to FIG. 9, the decryption protocol for handling decryption of an encrypted extended squitter is set forth. At a block 153, the monthly encryption code is provided in a manner similar to that of the block 102 (FIG. 7). The monthly encryption key consists of 192 bits, the 192 bits ordered to include: a control key segment of 8 bits; an address key segment of 24 bits; a first message key segment of 56 bits, a first parity key segment of 24 bits, a second message key segment of 56 bits and a second parity/identity key segment of 24 bits.

At a block 156, a message segment and a parity segment of an encrypted extended squitter are added modulo two to the second code message and parity segment to produce an unencrypted message segment and a singly-encrypted parity/identity segment. The encrypted extended squitter is a message defined according to the Mode-S convention and is a 112-bit word, consisting of an eight-bit control segment followed by a twenty-four bit address segment, then the fifty-six-bit message segment, and, finally, the twenty-four bit parity segment.

Padding is the process of using zero bits in a comparison process such that after comparison, the bits that were compared with zero bits generate bits identical to those input for comparison. In a presently preferred embodiment of the invention, the encrypted extended squitter is compared with a padding block, consisting of a thirty-two bit zero, concatenated with the message and parity segments of the second code segment.

At a block 159, the control and address segments of the encrypted extended squitter are concatenated with the unencrypted message segment and the singly-encrypted parity segment for comparison with the control, address, and message segments of the first code to generate a doubly decrypted extended squitter used later to generate a parity block. The doubly-decrypted extended squitter includes a singly-decrypted parity/identity segment and a singly-decrypted address segment.

At a block 162, the singly-decrypted parity/identity segment is shifted through a linear function shift register or LFSR to generate a shifted-singly-decrypted parity.

At a block 165, the singly-decrypted recipient address is added modulo two to the first parity/identity key segment to produce singly-encrypted recipient address segment.

At a block 168, the singly-encrypted recipient address segment is compared with the shifted-singly-decrypted parity/identity segment to produce a correction parity for use in a EDAC to generate an unencrypted extended squitter.

As is the case with any cryptographic system, the legitimate users (i.e., formation aircraft) are provided with the cryptographic key that is used to encrypt and decrypt the message, and this key is protected during generation and distribution to prevent unauthorized disclosure of the keys to an adversary. Without knowledge of the key, any attempts to change the encrypted message field result in failure of the 24-bit Mode-S parity check, which is computed prior to encryption and message transmission and after message reception and decryption.

It is appreciated by those skilled in the art, that until the decryption protocol operates on an encrypted extended squitter, the EDAC would reject the encrypted extended squitter as either garbled or random and therefore would reject the extended squitter. Additionally, while several comparisons through XOR gates occur in the course of encryption and decryption, the comparisons do not obscure the plaintext message as they are carried out with a rigor designed to do no violence to the original meaning of the text. While unrecognizable to equipment without the MEK, MEK-supplied equipment will readily discern the messages therein. Spoofing without the MEK is not possible because of the inherent rigor in the process.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the that follow.

What is claimed is:

1. A method for encrypting a Mode-S extended squitter, the Mode-S extended squitter including an eight-bit control segment followed by a twenty-four bit sender address segment, a fifty-six-bit message segment and a twenty-four-bit parity/identity segment, the method comprising:

providing a key, the key including a control key segment, an address key segment, a first message key segment, and a first parity/identity key segment;

adding modulo two the control segment to the control key segment to produce an intermediate control segment;

adding modulo two the address segment to the address key segment to produce an intermediate address segment;

adding modulo two the message segment to the first message key segment to produce an intermediate message segment;

adding modulo two the parity/identity segment to the first parity/identity key segment to produce an first intermediate parity/identity segment;

concatenating the intermediate control segment, the intermediate address segment, the intermediate message segment, and the intermediate parity/identity segment to produce an intermediate extended squitter;

shifting the intermediate extended squitter according to a linear function shift register to produce a shifted-intermediate parity/identity segment;

wherein the key further includes a second message key segment, and a second parity/identity key segment;

adding modulo two the message segment to the second message key segment to generate an encrypted message segment;

adding modulo two the shifted-intermediate parity segment to the second parity key to generate a doubly-encrypted parity/identity segment; and concatenating the control segment, the address segment, the encrypted message segment and the doubly-encrypted parity/identity segment to produce an encrypted extended squitter.

2. A Mode-S encrypter, the encrypter configured to encrypt a composed Mode-S extended squitter including an eight-bit control segment followed by a twenty-four bit address segment, a fifty-six-bit message segment, and a twenty-four-bit parity/identity segment, the encrypter comprising:

a first encryption component configured to adding modulo two a extended squitter to a first encryption key segment to produce an intermediate extended squitter;

a linear function shift register to shift the intermediate extended squitter to generate a shifted, singly-encrypted parity segment;

a parity encryption component configured to further adding modulo two the shifted singly-encrypted parity/identity segment to a parity/identity encryption segment to generate an doubly-encrypted parity/identity segment;

a message encryption component configured to adding modulo two the message segment to a message encryption key;

a extended squitter buffer configured to store the composed Mode S extended squitter;

a first key buffer configured to store the first encryption key segment;

an intermediate buffer configured to store the intermediate extended squitter; and an XOR gate configured to add modulo two the composed Mode S extended squitter to the first encryption key segment thereby to generate the intermediate extended squitter in the intermediate buffer.

3. The encrypter of claim 2, the parity encryption component comprising:

a shifted-singly-encrypted parity buffer configured to store the shifted-singly encrypted parity segment;

a parity key buffer configured to store the parity key segment;

an encrypted parity buffer configured to store the doubly-encrypted parity segment; and an XOR gate configured to add modulo two the shifted-singly encrypted parity to the parity key segment thereby to generate the doubly-encrypted parity segment in the encrypted parity buffer.

4. The encrypter of claim 2, the message encryption component comprising:

a message buffer configured to store the message segment;

a message key buffer configured to store message key segment;

an encrypted message buffer configured to store the encrypted message; and an XOR gate configured to add modulo two the message segment to the message key segment thereby to generate the encrypted message in the encrypted message buffer.

5. The encrypter of claim 2, the encrypter further comprising an output buffer, the output buffer configured to store:

the control segment;
the address segment;
the encrypted message segment; and
the doubly-encrypted parity/identity segment.

* * * * *